United States Patent
Kuku et al.

(10) Patent No.: US 9,981,220 B2
(45) Date of Patent: May 29, 2018

(54) EXHAUST GAS CLEAN-UP AND RECOVERY SYSTEM FOR FOSSIL FUEL FIRED POWER PLANT

(71) Applicants: Lai O. Kuku, Gilbert, AZ (US);
Melvin Mathew, Tempe, AZ (US);
Michael P. Woudenberg, Phoenix, AZ (US)

(72) Inventors: Lai O. Kuku, Gilbert, AZ (US);
Melvin Mathew, Tempe, AZ (US);
Michael P. Woudenberg, Phoenix, AZ (US)

(73) Assignee: MILLENIUM SYNTHFUELS CORPORATION, Gilbert, AZ (US)

( * ) Notice: Subject to any disclaimer, the term of this patent is extended or adjusted under 35 U.S.C. 154(b) by 0 days. days.

(21) Appl. No.: 15/694,706

(22) Filed: Sep. 1, 2017

(65) Prior Publication Data
US 2018/0036676 A1    Feb. 8, 2018

Related U.S. Application Data (63) Continuation-in-part of application No. 15/227,860, filed on Aug. 3, 2016, now Pat. No. 9,868,086.

(51) Int. Cl.
| | |
|---|---|
| *B01D 19/00* | (2006.01) |
| *B01D 53/14* | (2006.01) |
| *B01D 21/26* | (2006.01) |
| *C01F 11/46* | (2006.01) |
| *C01B 32/50* | (2017.01) |

(52) U.S. Cl.
CPC ..... *B01D 53/1425* (2013.01); *B01D 19/0031* (2013.01); *B01D 21/262* (2013.01); *B01D 53/1475* (2013.01); *B01D 53/1481* (2013.01); *B01D 53/1493* (2013.01); *C01B 32/50* (2017.08); *C01F 11/464* (2013.01); *B01D 2252/103* (2013.01); *B01D 2252/504* (2013.01)

(58) Field of Classification Search
CPC ........................................ C01B 31/20
USPC .............. 423/240, 243.1, 235; 422/168–172; 95/92; 96/202
See application file for complete search history.

(56) References Cited

U.S. PATENT DOCUMENTS

| | | | | |
|---|---|---|---|---|
| 4,625,661 A | * | 12/1986 | Melchior | F23G 5/0273 110/215 |
| 5,630,991 A | * | 5/1997 | Gal | B01D 53/501 423/243.01 |
| 5,900,042 A | * | 5/1999 | Mendelsohn | B01D 53/14 423/107 |

(Continued)

FOREIGN PATENT DOCUMENTS

GB      2540798 A   *   2/2017  ............. C10K 1/004

*Primary Examiner* — Nina Bhat (57) ABSTRACT

A fossil fuel fired power plant exhaust gas clean-up and recovery system is provided to remove detrimental compounds/elements from the exhaust gas emitting from the power plant to protect the environment and to recover useful products from the cleaning solution. This is accomplished by directing the exhaust gas from the fossil fuel fired power plant through a single wet scrubber having a cleaning solution of a predetermined pH. The cleaning solution is composed of calcium carbonate and water. A recovery process is attached thereto to reclaim calcium carbonate, calcium sulfate, and carbon dioxide for reuse in the process and/or for commercial use.

11 Claims, 5 Drawing Sheets

(56) References Cited

U.S. PATENT DOCUMENTS

| | | | | |
|---|---|---|---|---|
| 6,676,912 B1* | 1/2004 | Cooper | ............... | B01D 53/56 |
| | | | | 423/235 |
| 9,901,876 B1* | 2/2018 | Kuku | ................. | B01D 53/96 |
| 2002/0061270 A1* | 5/2002 | Osborne | ............. | B01D 53/60 |
| | | | | 423/210 |
| 2008/0075647 A1* | 3/2008 | Cochran | ............ | B01D 53/501 |
| | | | | 423/243.06 |
| 2010/0061909 A1* | 3/2010 | Kawamura | ........ | B01D 53/1456 |
| | | | | 423/243.02 |
| 2011/0024680 A1* | 2/2011 | Via | ..................... | B01D 53/64 |
| | | | | 252/182.32 |
| 2013/0028821 A1* | 1/2013 | Suchak | ............... | B01D 47/06 |
| | | | | 423/235 |

* cited by examiner

Fig. 5

EXHAUST GAS CLEAN-UP AND RECOVERY SYSTEM FOR FOSSIL FUEL FIRED POWER PLANT

TECHNICAL FIELD

The subject design relates generally to an exhaust gas clean-up system that helps to remove detrimental exhaust gas compositions when the exhaust gases are exposed to a cleaning solution of water and a chemically produced compound and more specifically relates to a process that cleans exhaust gas from a fossil fuel fired power plant to remove detrimental exhaust gas compositions and to reclaim compounds from the used cleaning solution.

BACKGROUND

There have been many different arrangements that attempt to remove detrimental flu gas compositions but most of them are only partially effective in removing most if not all of the detrimental exhaust gas compositions. This many times is based on the extreme cost of effective types of exhaust gas cleaning systems. Emissions of nitrogen oxides into the atmosphere can result in the generation of ozone in our atmosphere. Ozone is important in our higher altitudes since it helps to offset the effects of the sun's damaging rays on the earth. However, ozone can be a hazard to humans when it is within our habitable altitude. Another emitted gas that is detrimental is sulfur dioxide. It reacts with atmospheric water and causes acid rain. Likewise, carbon dioxide creates major environmental issues when exhausted into the atmosphere and is the main cause of global warming and climate change. U.S. Pat. No. 4,625,661 which issued on Dec. 2, 1986 to August S. Melchior teaches the use of boiling chambers followed by individual catalytic converters to vaporize small amount of hazardous waste materials. There is no teaching or suggestion of using a sole wet scrubber having a cleaning solution therein composed of calcium carbonate and water to remove these detrimental oxides from the exhaust gases of a fossil fuel fired power plant and to reclaim and/or reuse these reclaimed elements. U.S. Pat. No. 5,630,991 which issued on May 20, 1997 to Eli Gal et al teaches a process for dissolving limestone by adding ammonium ions to the process. Eli Gal et al is using ammonium ions to aid in breaking down the limestone to a more finite size and does not teach the use of adding a reacting compound to a reaction chamber to cause a chemical reaction to reduce detrimental elements in the exhaust gas. The adding of calcium hydroxide to the slurry of Eli Gal et al is done merely to raise the pH level therein. Other publications, such as: U.S. Pat. Nos. 5,362,468; 7,065,962; 5,034,204; and U.S. Publication 2008/0233025 each teach systems for addressing removal of certain gases from an exhaust gas. None of the above noted publication teach singularly or in combination the subject matter claimed herein. The subject design serves as another possible solution to at least the above noted detrimental exhaust gases.

SUMMARY OF THE INVENTION

According to the present design, an exhaust gas clean-up and recovery system is provided that is effective to remove various detrimental gases, such as, sulfur dioxide, carbon dioxide, nitrogen oxides, and water, from a fossil fuel fired power plant prior to the exhaust gas entering the atmosphere. In general these operational steps comprise directing the exhaust gas from the fossil fuel fired power plant to a single wet scrubber to modify the exhaust gas. To aid in modifying the exhaust gas from the fossil fuel fired power plant, the sole wet scrubber has a cleaning solution therein composed of calcium carbonate and water. Additional calcium carbonate is added to the cleaning solution in the wet scrubber to maintain a high pH of the cleaning solution within the wet scrubber. The used cleaning solution is directed through a recovery system to maintain a high pH of the cleaning solution in the wet scrubber and to recover calcium carbonate for reuse and to recover calcium sulfate and carbon dioxide for commercial use. The final chemically modified exhaust gas is released to the atmosphere.

Other objects, features, and advantages of the subject design will become more apparent from the following detailed description of the following embodiment and certain modification thereof when taken together with the accompanying drawing.

DETAILED DESCRIPTION

Figure 1:
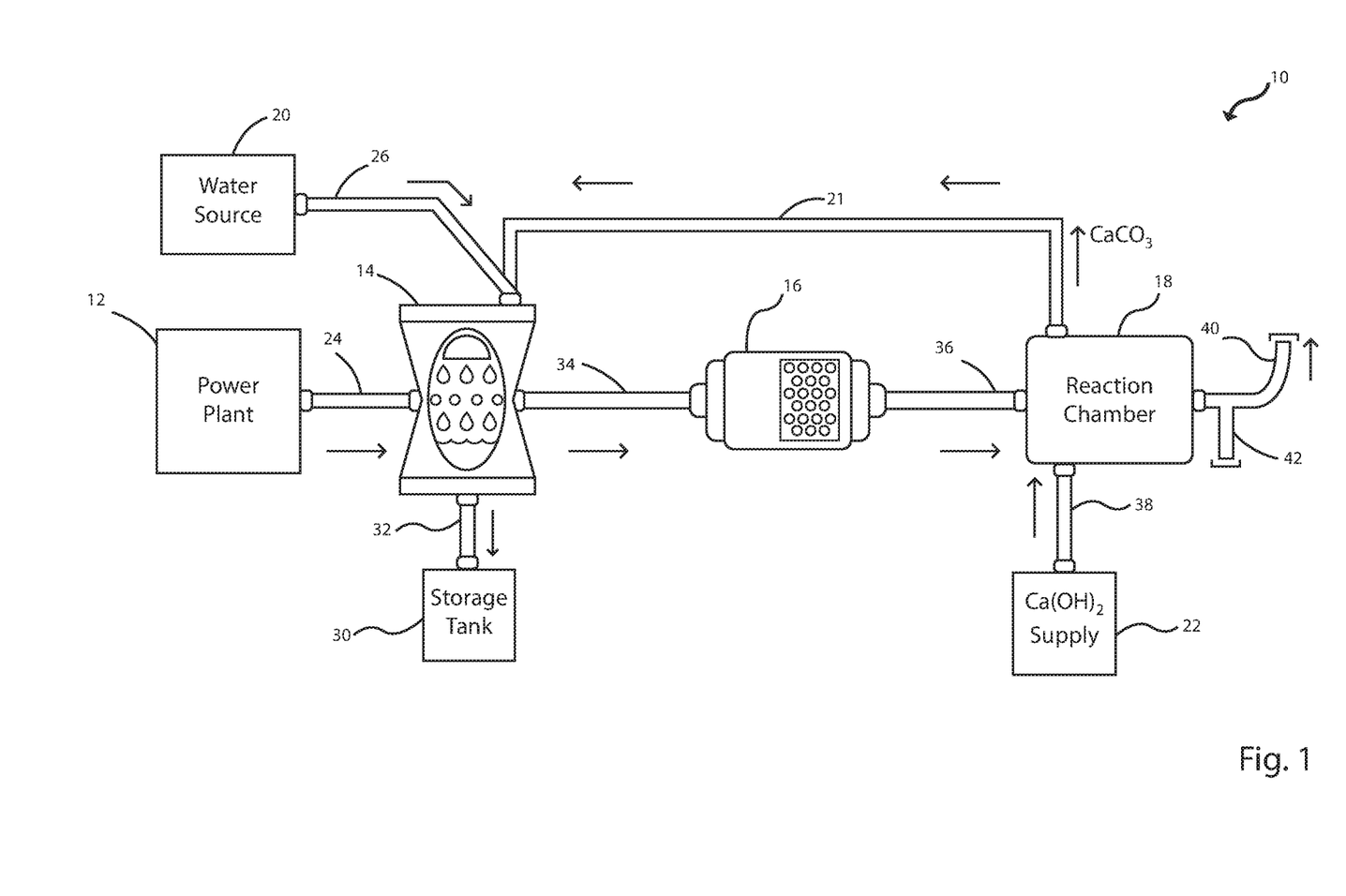
FIG. 1 is a partial flow chart and a partial diagrammatic representation of one embodiment of the subject design.

Referring to FIG. 1 of the drawings, an exhaust gas clean-up system 10 is provided. The exhaust gas clean-up system 10 is connected to the exhaust of a typical fossil fuel fired power plant 12. The exhaust gas from the fossil fuel fired power plant 12 contains various percentages of water ($H_2O$), nitrogen (N), sulfur dioxide ($SO_2$), carbon dioxide ($CO_2$), and nitrogen oxides ($NO_x$). There could be minimal amounts of carbon monoxide (CO) depending on the purity of the fossil fuel being used. The gas clean-up system 10 includes a wet scrubber 14, a catalytic converter 16, a reaction chamber 18, a source of water 20, a source of a chemically produced compound connecting line 21, and a source of reacting compound 22.

The wet scrubber 14 is connected to the exhaust of the power plant 12 by an exhaust gas connection line 24 and to the source of water 20 by a water connection line 26. The source 22 of the chemically produced compound is, in the subject arrangement, the reacting chamber 18 and is connected to the wet scrubber 14 by a compound connection line 21. The chemical reaction within the wet scrubber 14 produces a usable by-product and acts to remove the sulfur by the chemical reaction between the sulfur dioxide in the exhaust gas, the slurry of water and calcium carbonate as seen below:

This reaction consumes calcium carbonate, water, and oxygen in order to convert sulfur dioxide into $CaSO_4(2H_2O)$ which can be utilized in various ways as gypsum. The by-product of gypsum is directed to a holding tank 30 by a bypass line 32. This reaction cleans up the sulfur dioxide that is contained in the exhaust gas.

The chemically modified exhaust gas is now directed to the catalytic converter 16 by the converter connecting line 34 further chemically modifying the exhaust gas. The catalytic converter 16 can be a typical catalytic converter used in most automobiles. However, a platinum converter with an internal honeycomb arrangement is more effective even though the use of the platinum converter does not depart from the essence of the subject invention. Even though the catalytic converter 16 is shown upstream of the reaction chamber 18, it is recognized that it could be located downstream of the reaction chamber 18 without departing from the essence of the subject arrangement. The catalytic converter 16 would still function as described hereinafter.

Within the subject catalytic converter 16, the nitrogen oxides are converted into nitrogen (N) and oxygen ($O_2$). The residual carbon monoxide (CO) may convert into carbon dioxide ($CO_2$) and water ($H_2O$). The major difference between the use of fossil fuel, as used herein, and gas fuel as used in automobiles is that the burning of fossil fuel does not produce hydrocarbons like the burning of gasoline in automobiles. The burning of gasoline is responsible for the production of large amounts of carbon monoxides (CO), which usually are not present in fossil fuels. Even though catalytic converters are used in automobiles to reduce and/or remove carbon monoxide and hydrocarbons, these gases are not present in the subject exhaust gas. If they happen to be present, they will only be in minimal amounts. At this point within the design, the nitrogen oxides ($NO_x$) and the sulfur oxides ($SO_2$) have been addressed and that which is left is nitrogen gas (N), water ($H_2O$), carbon dioxide ($CO_2$), and oxygen ($O_2$).

In order to eliminate carbon dioxide ($CO_2$) emissions as well as provide the wet scrubber 14 with the chemically produced compound, i.e. calcium carbonate ($CaCO_3$) and water, the further chemically modified exhaust gas is passed to the reaction chamber 18 through a reacting connection line 36. The source of reacting compound, i.e. calcium hydroxide ($Ca(OH)_2$, is introduced in the reaction chamber 18 through a reacting compound line 38.

The chemical reaction within the reaction chamber is as follows:

$$Ca(OH)_2 + CO_2 = CaCO_3 + H_2O$$

The calcium carbonate ($CaCO_3$) and water are directed from the reaction chamber 18 to the wet scrubber 14 as the source of chemically produced compound and to add water thereto also. The source of chemically produced compound and water from the reaction chamber 18 are returned through the source of compound connecting line 21. The volume of calcium carbonate and water being bypassed from the reaction chamber 18 to the wet scrubber 14 through the source of compound connecting line 21 will normally be sufficient to continue the operating process without the need of the water source 20.

At this point in the process, the final chemically modified exhaust gas can be safely emitted into the atmosphere through an exhaust line 40. Any water that is passing through the exhaust line 40 can be bypassed to a water tank 42.

Figure 2:
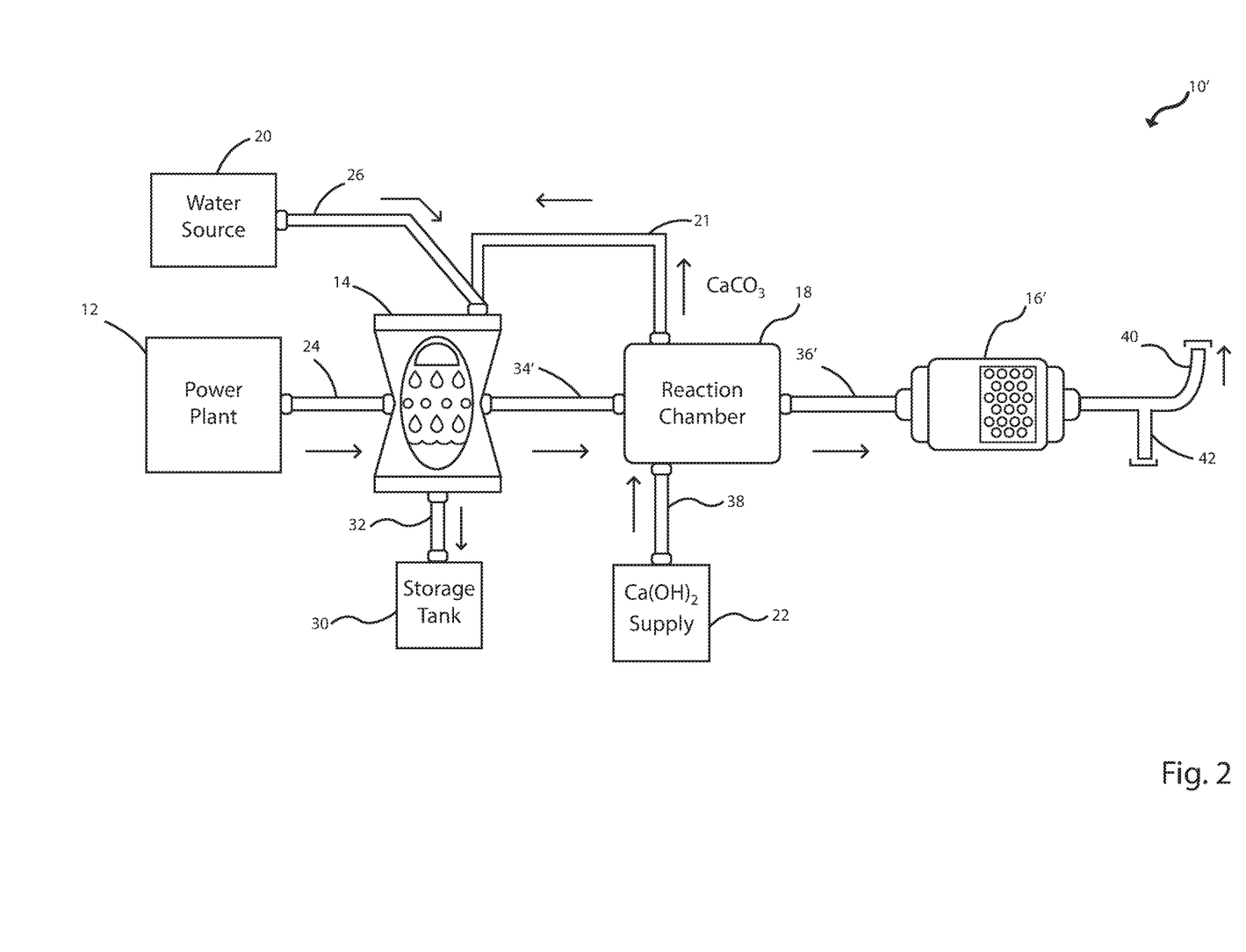
FIG. 2 is a partial flow chart and a partial diagrammatic representation of another embodiment of the subject design.

Referring to the embodiment of FIG. 2, like elements have like element numbers and moved/modified elements have like element numbers with a 'prime' symbol attached thereto.

In the embodiment of FIG. 2, the catalytic converter 16 of FIG. 1 has been moved from a location upstream of the reaction chamber 18 to a location downstream thereof between the downstream side of the reaction chamber 18 and the atmosphere. All aspects from the embodiment of FIG. 2 function in the same manner as that of FIG. 1. Since the reaction chamber 18 serves to eliminate carbon dioxide present and the catalytic converter eliminates nitrogen oxides, the exhaust gas is now safe to vent it to the atmosphere.

Figure 3:
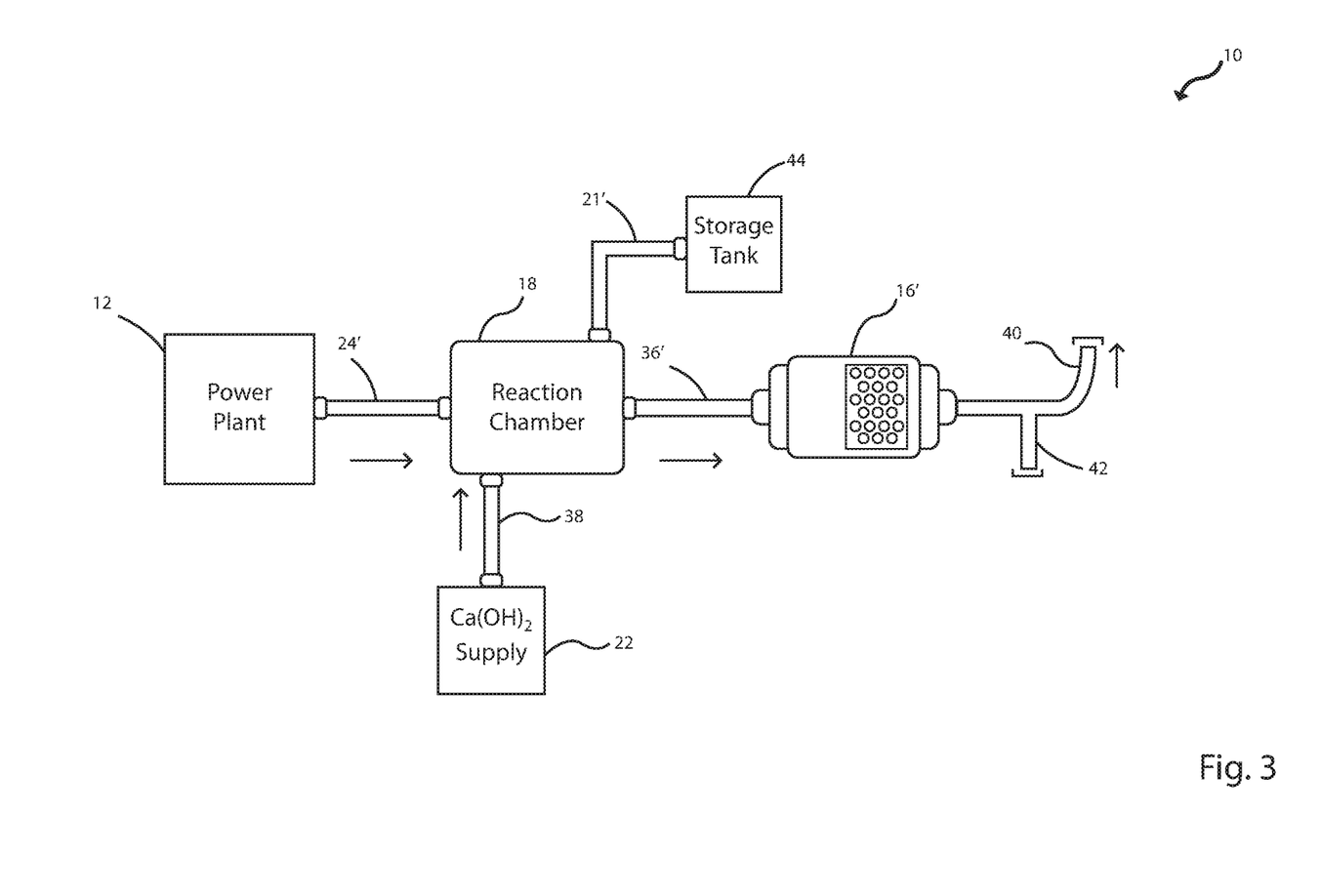
FIG. 3 is a partial flow chart and a partial diagrammatic representation of yet another embodiment of the subject design.

Referring to the embodiment of FIG. 3 as compared to FIGS. 1-2, like elements have like element numbers and moved/modified elements has like element numbers with a 'prime' symbol attached thereto.

In the embodiment of FIG. 3, the wet scrubber 14 has been deleted and the catalytic converter 16 has been moved to a location downstream of the reaction chamber 18. The calcium carbonate ($CaCO_3$) and water being bypassed from the reaction chamber 18 in FIGS. 1 and 2 are being directed through the chemically produced compound line 21' to a storage tank 44. This calcium carbonate and water can be further processed as needed to extract calcium carbonate or to produce a gypsum product. The chemical reaction that was taking place in the wet scrubber 14 of FIGS. 1 and 2 is also taking place in the reaction chamber 18. Consequently, in most applications, the wet scrubber 14 is not needed. As previously noted with respect to FIG. 2, the catalytic converter 16' functions in the same manner as that described in FIG. 1 and FIG. 2.

Figure 4:
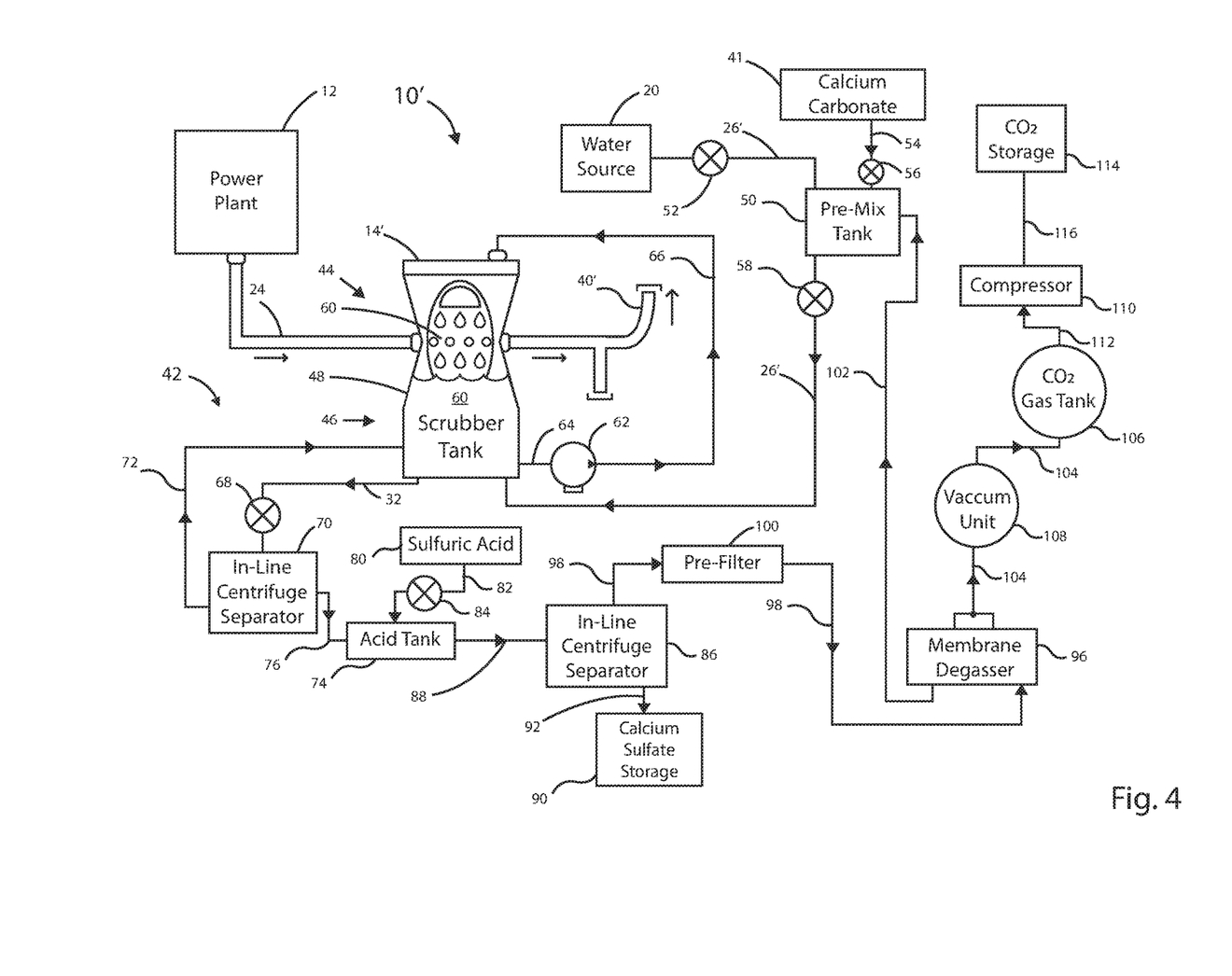
FIG. 4 is a partial flow chart and a partial diagrammatic representation of still another embodiment of the subject design.

Referring to the embodiment of FIG. 4, as compared to FIGS. 1-3, like elements have like element numbers and moved/modified elements has like element numbers with a 'prime' symbol attached thereto.

In the embodiment of FIG. 4 of the drawings as compared to FIGS. 1-3, FIG. 4 sets forth an embodiment that uses only one wet scrubber 14' and does not use a reaction chamber 18 or a catalytic converter 16/16'. The concept of FIG. 4 also sets forth recovery of calcium carbonate for reuse and recovery of calcium sulfate and carbon dioxide for commercial use without requiring other treatment of the exhaust gases from the fossil fuel fired power plant 12.

Referring specifically to FIG. 4, an exhaust gas clean-up and recovery system 10' is provided. The fossil fuel fired power plant 12 is connected to the exhaust system 10' by the exhaust connection line 24. The exhaust gas clean-up and recovery system 10' includes a single wet scrubber 14' connected to the fossil fuel fired power plant 12 through the exhaust connection line 24 and to the atmosphere through exhaust connection line 40'. The exhaust gas from the fossil fuel fired power plant 12 flows through the connection line 24, the single wet scrubber 14', and the connection line 40' to the atmosphere. The exhaust gas from the fossil fuel fired power plant 12 contains detriment gases, such as, carbon dioxide, sulfur dioxide, and nitrogen oxide. The gas clean-up and recovery system 10' further includes a source 41 of calcium carbonate selectively connected to the single wet scrubber 14', a recovery system 42 connected to the wet scrubber 14', the source 20 of water selectively connected to the wet scrubber 14', and the exhaust line 40' connecting the single wet scrubber 14' to the atmosphere.

The wet scrubber 14' has a top portion 44, a bottom portion 46, and a scrubber tank 48 defined in the bottom portion 46 thereof. The single wet scrubber 14' is connected to the source 20 of water by the water connection line 26'. A pre-mix tank 50 is disposed in the water connection line 26' between the source 20 of water and the bottom portion 46 of the single wet scrubber 14'. A remotely controlled shutoff valve 52 is disposed in the water connecting line 26' between the source 20 of water and the pre-mix tank 50 and is operative to selectively control the flow of water to the pre-mix tank 50. The source 41 of calcium carbonate is selectively connected to the pre-mix tank 50 by a connection line 54 and has a remotely controlled shutoff valve 56 disposed therein. A remotely controlled shutoff valve 58 is disposed in the water connecting line 26' between the pre-mix tank 50 and the bottom portion 46 of the single wet scrubber 14'.

The calcium carbonate from the source 41 of calcium carbonate mixes with the water in the single wet scrubber 14' to form a cleaning solution 60 therein. A circulating pump 62 is connected to the bottom portion 46 of the scrubber tank 48 by a connection line 64 and to the top portion 44 of the single wet scrubber 14' by a connection line 66 and operative to selectively, continuously circulate fluid from the scrubber tank 48 to the top portion 44 of the single wet scrubber 14' and down through the wet scrubber 14' to the scrubber tank 48.

The chemical reaction of the exhaust gas and the cleaning solution 60 within the single wet scrubber 14' is hereinafter set forth. The carbon dioxide in the exhaust gas chemically reacts with the cleaning solution 60 to produce calcium bicarbonate while at the same time additional carbon dioxide chemically reacts with the water to produce carbonic acid. The sulfur dioxide in the exhaust gas chemically reacts with the calcium carbonate in the cleaning solution 60 to produce calcium sulfate and carbon dioxide. The carbon dioxide then chemically reacts with the water to produce additional carbonic acid. The nitrogen oxide in the exhaust gas chemically reacts with the water to produce nitric acid. The nitric acid then reacts with the calcium carbonate in the cleaning solution 60 to produce calcium nitrate and carbonic acid. The calcium carbonate and calcium sulfate mix with water to form a slurry of calcium salts in water while a very small portion of the calcium carbonate and the calcium sulfate mixes with and/or goes into solution with the water. The produced calcium bicarbonate, the produced carbonic acid, and the calcium nitrate each respectfully go into solution with the water since they are soluble in water.

The used cleaned solution 60 is selectively removed from the scrubber tank 48 and selectively directed into the recovery system 42 through the connection line 32. A remotely controlled shutoff valve 68 is disposed in the connection line 32. The used cleaning solution 60 exiting the single wet scrubber 14' is made up of the slurry of calcium carbonate and calcium sulfate mixed with water, the small amounts of calcium carbonate and calcium sulfate in water, and the water solutions of calcium nitrate, calcium bicarbonic and carbonic acid.

The used cleaning solution is directed to a first inline centrifuge separator 70. The first inline centrifuge separator 70 operatively separates most of the heavier calcium salts, along with some water, and delivers it to the scrubber tank 48 through a connection line 72. It is recognized that the water may have very small amounts of carbonic acid therein. The first inline centrifuge separator 70 further directs the water solutions along with the small amounts of calcium carbonate and calcium sulfate being carried with the water solutions downstream to separate the carbon dioxide from the fluid solutions.

The water solutions along with the small, lightweight slurry of calcium salts are directed into an acid tank 74 through a connection line 76. The acid tank 74 is dosed with sulfuric acid to produce an exothermic reaction. It is recognized that other acids could be used without parting from the essence of the subject invention. However, sulfuric acid is preferred. The main purpose of the sulfuric acid is to aid in loosening the dissolved carbon dioxide contained in the water solutions passing therethrough, thus freeing harmless nitrogen gas and oxygen to pass on through. Furthermore the chemical reaction within the acid tank converts any calcium carbonate therein to calcium sulfate. Also, due to the heat energy being produced in the acid tank 74, the carbon dioxide is released from the solutions of calcium bicarbonate and carbonic acid. A source 80 of sulfuric acid is selectively connected to acid tank 74 through a connection line 82 having a remotely controlled shutoff valve 84 disposed in the connection line 82.

After the sulfuric acid dosage, the water solutions are directed to a second inline centrifuge separator 86 through a connecting line 88. The second inline centrifuge separator 86 operatively separates the heavier calcium sulfate from the water solution and directs the calcium sulfate to a calcium sulfate storage 90 for commercial use through a connection line 92. The remainder of water solution, primarily containing water and carbon dioxide, is directed on to a membrane degasser 96 through a connection line 98. A pre-filter 100 is disposed in the connection line and operative to filter out any solids that may remain in the water solutions.

The membrane degasser 96 functions to separate the carbon dioxide gas from the water. The water is directed back to the pre-mix tank 50 through a connection line 102. The pH of the water and calcium carbonate solution in the pre-mix tank 50, if needed, can be increased by adding more calcium carbonate to the pre-mix tank 50 from the source 41 of calcium carbonate. The carbon dioxide gas is directed from the membrane degasser 96 through connection line 104 to a carbon dioxide gas tank 106. To aid in the removal of the carbon dioxide from the membrane degasser 96, a vacuum unit 108 is provided in the connection line 104. The vacuum unit 108 pulls the carbon dioxide gas from within the membrane degasser 96 and aid in delivering it to the carbon dioxide gas tank 106. The carbon dioxide gas from the carbon dioxide gas tank 106 is directed to a compressor 110 through connection line 112 and into a carbon dioxide storage 114 through a connection line 116 for commercial uses.

Figure 5:
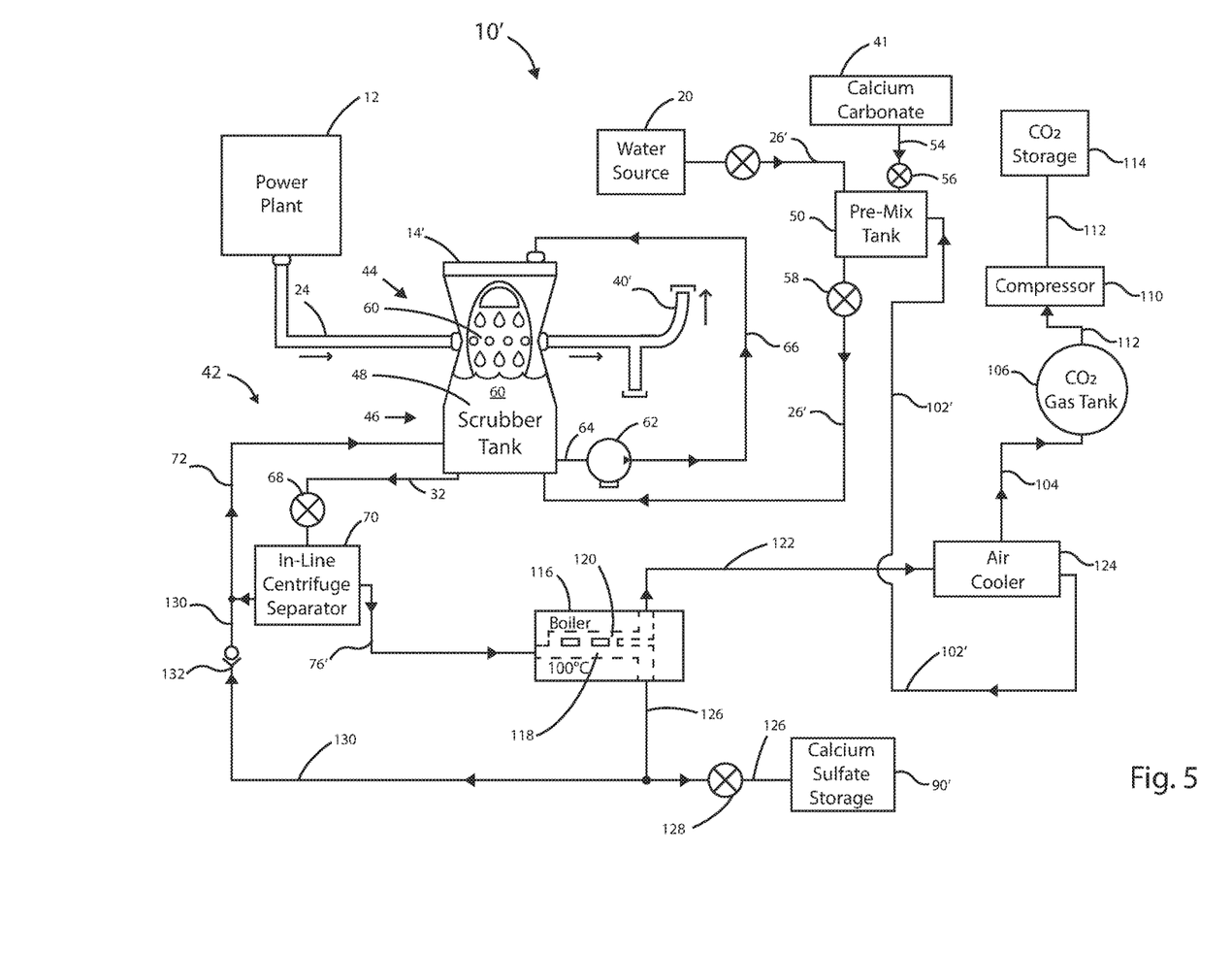
FIG. 5 is another partial flow chart and partial diagrammatic representation of an alternate process for a portion of the recovery system set forth in FIG. 4.

Referring to the embodiment of FIG. 5, as compared to FIGS. 1-4, like elements have like element numbers and moved/modified elements has like element numbers with a 'prime' symbol attached thereto.

All of the aspects with respect to FIG. 4, from the fossil fuel fired power plant 12 through the single wet scrubber 14', are the same in FIG. 5. Likewise, the circulating pump 62 and it associated connection lines with the single wet scrubber is the same as FIG. 5. The used cleaning solution exiting the single wet scrubber 14' and entering the first inline centrifuge separator 70 and the connection line 72 from the first inline centrifuge separator 70 back to the scrubber tank 48 as set forth with respect to Fig., is the same as FIG. 5.

With reference to FIG. 5, the connection line 76' directs the water solutions along with the small, lightweight slurry of calcium salts from the first inline centrifuge separator 70 to a boiler 116. As the water solution and the small, lightweight slurry of calcium salts passes through a main boiler tube 118, the heat therein converts the water into the carbon dioxide water/gas mixture that enters into a water/gas tube 120. The carbon dioxide water/gas mixture passes through the water/gas tube 120 to a connection line 122. The carbon dioxide water/gas mixture in connection line 122 is delivered to an air cooler 124. In the air cooler 124, the water/gas condenses into carbon dioxide gas and water. The water in the air cooler 124 is directed back to the pre-mix tank 50 through the connection line 102'. The carbon dioxide gas in the air cooler 124 is directed through the connection line 104 to the carbon dioxide gas tank 106 as set forth in FIG. 4. Likewise, the carbon dioxide gas is compressed in compressor 110 and stored in a carbon dioxide storage 114 for commercial uses.

The heavier calcium salts with some water enters a connection line 126 at the bottom of the boiler 116. Calcium sulfate that builds up in the connection line 126 is selectively passed on to the calcium sulfate storage 90'. A remotely controlled shutoff valve 128 is disposed in the connection line 126 between the boiler 116 and the calcium sulfate storage 90'. Calcium carbonate along with water is directed from the connection line 126 through connection line 130 having a one-way check valve 132 disposed therein to the connection line 72 and on to the scrubber tank 48.

As with respect to FIG. 1, the embodiments of FIGS. 2-5, the cleaned exhaust gas may be safely emitted into the atmosphere without concern.

INDUSTRIAL APPLICABILITY

The subject processes set forth herein for exhaust gas clean-up provides a simple, safe, cost effective and an excellent process for removing detrimental compounds/elements from the exhaust of a fossil fuel fired power plant 12.

By directing the exhaust gas from the fossil fuel fired power plant 12 through any of the five embodiments presented herein, the detrimental compounds previously noted are removed. With respect to FIG. 1, a wet scrubber 14 having a solution of water, calcium carbonate ($CaCO_3$), oxygen ($O_2$), and sulfur dioxide ($SO_2$) therein, the sulfur is chemically removed and the by-product of the gypsum slurry ($CaSO_4(2H_2O)$) is directed to a storage tank 30. During the reaction within the wet scrubber 14, the calcium carbonate ($CaCO_3$), water ($H_2O$), and oxygen ($O_2$) is consumed to convert the sulfur dioxide ($SO_2$) to the gypsum slurry ($CaSO_4(2H_2O)$). Even though the wet scrubber 14, is connected to the remote source of waster 20, the water being produced in the reaction chamber 18 and directed to the wet scrubber 14 through the source compound connection line 21 during the production of the calcium carbonate ($CACO_3$) is normally sufficient.

The chemically modified exhaust gas is passed through the catalytic converter 16 to provide chemical reaction like that of catalytic converters in automobiles. With the exception, the exhaust gases in fossil fuel fired power plants do not contain any appreciable amounts of carbon monoxide and is free of hydrocarbons. As previously stated, within the catalytic converter 16, the nitrogen oxides ($NO_2$) converts into nitrogen gas (N) and oxygen ($O_2$). The only things left at this point to treat is carbon dioxide ($CO_2$), nitrogen gas (N), water and oxygen. In order to reduce the carbon dioxide ($CO_2$) emissions as well as provide calcium carbonate ($CaCO_3$) for the wet scrubber, the exhaust gas is passed through the reaction chamber 18 that has calcium hydroxide ($Ca(OH)_2$ added therein. In the subject embodiment, the volume of calcium hydroxide ($Ca(OH)_2$ needed is approximately 962 g per 2380 L of incoming exhaust gas from the power plant 12. Within the reaction chamber 18, the chemical reaction of the calcium hydroxide ($Ca(OH)_2$ and carbon dioxide ($CO_2$), as set forth above, generates the calcium carbonate ($CaCO_3$) and water as needed in the wet scrubber 14. During this chemical reaction, the carbon dioxide ($CO_2$) level is eliminated or at least reduced to trace amounts. During the chemical reaction within the reaction chamber 18, for every 285.88 L of carbon dioxide ($CO_2$), it requires 953 g of calcium hydroxide ($Ca(OH)_2$. When the exhaust gas from the power plant 12 is low in sulfur, excess calcium carbonate ($CaCO_3$) is being generated in the reaction chamber 18. Consequently, if the exhaust gas from the power plant 12 is higher in sulfur, the extra sulfur can be readily removed due to the extra calcium carbonate ($CaCO_3$) being produced. This would not require extra calcium hydroxide ($Ca(OH)_2$ since the amount of carbon dioxide has not been changed. Furthermore an additional volume of the by-product gypsum will be produced.

As previously noted with respect to FIGS. 2 and 3, the location of the catalytic converter 16 in the exhaust gas stream is not critical. The function of the catalytic converter 16 remains the same as it was in FIG. 1. The removal of the wet scrubber 14 does not inhibit the removal thereof in most applications since the same function is being performed in the reaction chamber 18. However, it is recognized that the wet scrubber 14 could be utilized as needed.

With respect to FIGS. 4 and 5, a single wet scrubber 14' is disposed between the fossil fuel fired power plant 12 and the atmosphere and is effective to remove detrimental elements from the exhaust gas from the power plant 12. In FIGS. 4 and 5, a recovery system 42 is also provided in combination with the single wet scrubber 14' and is operative to save some compounds for reuse in the cleaning and recovery system 10' and save other compounds for commercial use.

The single wet scrubber 14' of FIGS. 4 and 5 uses the solution of water and calcium carbonate in the single wet scrubber 14' to clean the exhaust gas from the fossil fuel fired power plant. This is similar to that discussed in the previous embodiments. However, in the subject embodiments of FIGS. 4 and 5, the pH of the cleaning solution is held at a level higher than water. The higher pH greatly aids the various chemical reactions happening within the scrubber tank 48 of the single wet scrubber 14'.

The carbon dioxide in the exhaust gas chemically reacts with the cleaning solution 60 to produce calcium bicarbonate while at the same time additional carbon dioxide chemically reacts with the water to produce carbonic acid. The sulfur dioxide in the exhaust gas chemically reacts with the calcium carbonate in the cleaning solution 60 to produce calcium sulfate and carbon dioxide. The carbon dioxide then chemically reacts with the water to produce additional carbonic acid. The nitrogen oxide in the exhaust gas chemically reacts with the water to produce nitric acid. The nitric acid then reacts with the calcium carbonate in the cleaning solution 60 to produce calcium nitrate and carbonic acid. The calcium carbonate and calcium sulfate mix with water to form a slurry of calcium salts in water while a very small portion of the calcium carbonate and the calcium sulfate mixes with and/or goes into solution with the water. The produced calcium bicarbonate, the produced carbonic acid, and the calcium nitrate each respectfully go into solution with the water since they are soluble in water.

The used cleaning solution of the cleaning solution 60 exits the single wet scrubber 14' and enters the recovery system 42. The used cleaning solution is selectively directed to the first inline centrifuge separator 70 where the heavier slurry of calcium salts along with some water are separated from the other lighter solutions. The heavier slurry of calcium salts are directed back to the scrubber tank 48 along with the water which contains some carbon dioxide for reuse in the system. In the event the pH of the cleaning solution lowers towards the pH of water, more calcium carbonate is added to the premix tank 50 and the higher concentration of calcium carbonate solution in the premix tank 50 is directed into the scrubber tank 48 of the single wet scrubber 14' to raise the pH level therein.

The liquid solution from the first inline centrifuge separator 70 is directed downstream through connection line 76 to reclaim carbon dioxide, calcium sulfate and remove other trace element. The liquid solution in connection line 76 is directed into the acid tank 74 where sulfuric acid is selectively directed into the acid tank 74. The dosage of sulfuric acid added to the acid tank is about 5 milliliters (0.000176 oz) per 18.927 milliliters (5.0 gallons) of the volume in the acid tank. The sulfuric acid chemically reacts with the liquid solution therein. As previously stated, the main purpose of the sulfuric acid is to aid in loosening the dissolved carbon dioxide contained in the water solutions passing therethrough thus freeing nitrogen gas and oxygen to pass on through. Furthermore the chemical reaction within the acid tank converts any calcium carbonate therein to calcium sulfate. Also, due to the heat energy being produced in the acid tank 74, the carbon dioxide is released from the solutions of bicarbonate and carbonic acid. The used liquid solution exiting the acid tank 74 is directed to a second inline centrifuge separator 86. The heavier calcium sulfate is directed to a calcium sulfate storage 90 for commercial use and the lighter liquid solution is passed on through the pre-filter 100 to the membrane degasser 96. The pre-filter 100 is used only to trap larger particles from reaching the membrane degasser 96 which would hamper its operating life.

The membrane degasser 96 separates the water from the carbon dioxide gas. The water, still maintaining a pH of above 7, is returned to the pre-mix tank 50 wherein the pH of the fresh cleaning solution in the pre-mix tank 50 can be further enriched by adding more calcium carbonate to the pre-mix tank 50. The carbon dioxide gas from the membrane degasser 96 is directed to the compressor 110 and subsequently to the carbon dioxide storage for commercial use. In order to more effectively get the carbon dioxide from the membrane degasser 96 to the compressor 110, the vacuum unit 108 serves to pull the carbon dioxide gas from the membrane degasser and direct it on to the compressor 110.

In the embodiment of FIG. 5, everything function in the same manner except how the used liquid solution exiting the first inline centrifuge separator 70 in connection line 76' is being processed. In FIG. 5, the liquid solution is directed to the boiler 116. As the liquid solution is being passed through the main boiler tube 118, the carbon dioxide gas is freed from the liquid solution by the heat energy within the boiler 116 being maintained at a temperature of about 100 degrees C. As the liquid solution passes through the heated main tube 118, freed nitrogen and oxygen passes out with the carbon dioxide to the air cooler 124. The remaining liquid solution in the main boiler tube 118 exits into the connection line 126. The remaining liquid solution contains small amounts of calcium carbonate and more calcium sulfate. These calcium salts will tend to build-up in the connection line 126. The calcium sulfate is selectively passed through the remotely controlled shutoff valve 128 and contained in the calcium sulfate storage 90' for commercial use. The slurry of calcium carbonate with small amounts of calcium sulfate therein is directed through connection line 130, one-way check valve 132, and connection line 72 back to the scrubber tank 48 within the single wet scrubber 14'.

The freed carbon dioxide water/gas solution passes into the water/gas tube 120 and out to the air cooler 124 through the connecting line 122. In the air cooler 124, as set forth with respect to FIG. 4, the water separates from the carbon dioxide gas and is returned to the pre-mix tank 50. Likewise, the carbon dioxide gas is compressed and retained in the carbon dioxide storage 114 for commercial use.

In conclusion, the above noted processes address the issues of nitrogen oxide ($NO_x$), sulfur dioxide ($SO_2$), and carbon dioxide ($CO_2$) present or produced within the process. In one or more of the embodiments, the carbon dioxide ($CO_2$) is removed by reacting it with the calcium hydroxide ($Ca(OH)_2$ to produce the calcium carbonate ($CaCO_3$) that is used in the wet scrubber 14, or stored in the storage tank 44. In one or more of the embodiments, a recovery process 42 is provided to reclaim certain compounds for reuse in the system or to store for commercial use. Furthermore, in one or more of the embodiments, the pH of the cleaning solution used in the wet scrubber 14' is controlled and maintained above the pH of water.

Other embodiments as well as certain variations and modifications of the embodiment herein shown and described will obviously occur to those skilled in the art upon becoming familiar with the underlying concept. It is to be understood, therefore, that the subject design, as claimed, may be practiced otherwise than as specifically set forth above.

What is claimed is:

1. A process for removing carbon dioxide, sulfur dioxide, nitrogen dioxide, and water from the exhaust gas of a fossil fuel fired power plant prior to the exhaust gas entering the atmosphere, the process includes passing the exhaust gas through a single wet scrubber having a cleaning solution of water and calcium carbonate contained therein, and reclaiming calcium carbonate, calcium sulfate, carbon dioxide, and water from the used cleaning solution, the steps of the process comprising:

maintaining a high pH of the cleaning solution within the wet scrubber for converting the oxides of carbon, sulfur, and nitrogen from the exhaust gas into calcium salts comprising insoluble calcium carbonate, insoluble calcium sulfate, soluble calcium nitrate, and soluble calcium bicarbonate, and for enhancing the dissolution of carbon dioxide gas in water to chemically form soluble carbonic acid with the water, mixing the insoluble calcium carbonate and the insoluble calcium sulfate with the water to form a slurry of calcium salts, mixing the soluble calcium nitrate, the soluble calcium bicarbonate, and the soluble carbonic acid water to form a liquid solution, directing the used cleaning solution from the wet scrubber to a first in-line centrifuge separator to separate the slurry of calcium salts form the liquid solution;

directing the separated calcium salts from the first in-line centrifuge separator back to the cleaning solution in the wet scrubber for reuse; and directing the liquid solution along with any remaining used cleaning solution downstream to one of an acid tank and a boiler for the reclaiming of carbon dioxide and calcium salts.

2. The process of claim 1 wherein in the step of directing the liquid solution downstream includes the steps of directing the calcium salts into an acid tank;

adding a predetermined volume of acid to the acid tank to chemically convert the remaining calcium carbonate into calcium sulfate, water and carbon dioxide and to chemically release the carbon dioxide from the bicarbonates and the carbonic acid to form carbon dioxide and water, due to the exothermic chemical reaction within the acid tank, the nitrogen is freed from the water solution and removed as an inert gas;

directing the used cleaning solution from the acid tank to a second in-line centrifuge separator to separate the calcium sulfate from the carbon dioxide and water;

directing the calcium sulfate to a calcium sulfate storage tank for commercial uses;

directing the carbon dioxide and water containing particles of calcium salts from the second in-line centrifuge separator to a membrane degasser for separating the carbon dioxide from the water;

directing the separated water from the membrane degasser back to the wet scrubber for reuse;

removing the carbon dioxide gas from the membrane degasser with a vacuum unit;

directing the separated carbon dioxide to a compressor and subsequently to a storage tank for commercial use.

3. The process of claim 1 wherein the cleaned exhaust gases exiting the wet scrubber are free of detriment gases and are vented to the atmosphere.

4. The process of claim 2 wherein the acid in the acid tank is sulfuric acid.

5. The process of claim 1 including adding a pre-mix tank to combine the calcium carbonate and water and selectively directing the mixed cleaning solution to the wet scrubber as needed to maintain the high pH of the cleaning solution.

6. The process of claim 5 wherein in the step of maintaining a high pH of the volume of calcium carbonate in water, the pH level is maintained in the range of pH 7.5 through pH 14.

7. The process of claim 6 wherein in the step of maintaining the high pH, the pH level is maintained at about 8.5.

8. The process of claim 2 wherein the predetermined volume of sulfuric acid added to the acid tank is about 5 milliliters (0.000176 oz) per 18.927 liters (5.0 gallons) of the volume in the acid tank.

9. The process of claim 2 including the step of adding a pre-filter between the second in-line centrifuge separator and the membrane degasser for trapping particles of calcium salts contained therein.

10. The process of claim 1 wherein in the step of directing the liquid solution and the slurry of calcium carbonate and calcium sulfate downstream includes the steps of directing the slurry of calcium carbonate and calcium sulfate mixed in water along with the liquid solution into a boiler to separate the liquid solution from the heavier calcium salts slurry and to convert the liquid solution into a water/gas solution;

directing the heavier calcium salt slurry containing calcium carbonate and calcium sulfate from the boiler to a connection line wherein calcium sulfate is selectively directed therefrom to a calcium sulfate storage;

directing the calcium carbonate and any small amounts of calcium sulfate along with the small volume of water back to the scrubber tank in the single wet scrubber;

directing the water/gas volume to an air cooler to condense the water/gas solution into water and carbon dioxide gas;

directing the water to the pre-mix tank; and directing the carbon dioxide gas to a compressor and subsequently to a carbon dioxide storage.

11. The process of claim 10 wherein the cleaned exhaust gas exiting the wet scrubber is free of detrimental gases and the exhaust gas is vented to the atmosphere.

* * * * *